United States Patent [19]
Kraft et al.

[11] Patent Number: 5,405,475
[45] Date of Patent: Apr. 11, 1995

[54] METHOD AND APPARATUS FOR CONTINUOUS MANUFACTURE OF PRINTED LAMINATED STOCK FROM UNCOATED WEB

[75] Inventors: Roger E. Kraft; Merlin F. Mercer; Roy A. Johnson, all of Fort Scott, Kans.

[73] Assignee: Ward/Kraft, Ft. Scott, Kans.

[21] Appl. No.: 69,086
[22] Filed: May 28, 1993
[51] Int. Cl.⁶ .................................... B32B 31/00
[52] U.S. Cl. ...................... 156/275.5; 156/275.7; 156/277; 156/289; 156/324; 156/380.9; 156/387; 156/388; 156/390; 156/498; 156/547
[58] Field of Search ............ 156/277, 289, 324, 275.5, 156/275.7, 380.9, 387, 388, 390, 498, 547; 118/641, 642

[56] References Cited

U.S. PATENT DOCUMENTS

| | | |
|---|---|---|
| 1,799,865 | 4/1931 | Rife . |
| 2,220,071 | 11/1940 | Avery . |
| 2,303,346 | 12/1942 | Flood . |
| 3,396,699 | 8/1968 | Beebe et al. ............ 118/642 |
| 3,501,365 | 3/1970 | Marshall . |
| 3,668,193 | 6/1972 | King ..................... 428/421 |
| 4,035,218 | 7/1977 | Yount ..................... 156/289 |
| 4,060,168 | 11/1977 | Romagnoli . |
| 4,150,183 | 4/1979 | Reed . |
| 4,159,585 | 7/1979 | Brown . |
| 4,166,150 | 8/1979 | Mattor et al. ............ 156/289 |
| 4,214,024 | 7/1980 | Jacobson . |
| 4,231,833 | 11/1980 | Lieberman . |
| 4,241,198 | 12/1980 | Kobayashi ............... 156/289 |
| 4,267,240 | 5/1981 | Jaisle et al. ............. 156/289 |
| 4,331,736 | 5/1982 | Schäfer et al. ........... 156/289 |
| 4,379,573 | 4/1983 | Lomeli et al. . |
| 4,388,137 | 6/1983 | McCarty et al. ......... 156/289 |
| 4,425,386 | 1/1984 | Chang . |
| 4,551,925 | 11/1985 | Ericsson ................. 118/642 |
| 4,586,611 | 5/1986 | Scalzo . |
| 4,661,189 | 4/1987 | Voy et al. ............... 156/277 |
| 4,729,506 | 3/1988 | Neubauer . |
| 4,868,027 | 9/1989 | Hunkeler et al. . |
| 4,877,177 | 10/1989 | Felix . |
| 4,985,274 | 1/1991 | Wright .................. 156/289 |
| 5,011,559 | 4/1991 | Felix . |
| 5,021,110 | 6/1991 | Kobayashi . |
| 5,021,273 | 6/1991 | Kobayashi . |
| 5,061,170 | 10/1991 | Allen et al. . |
| 5,225,022 | 7/1993 | Baker et al. ............ 156/324 |

FOREIGN PATENT DOCUMENTS 280495  5/1952  Switzerland .
2127378  4/1984  United Kingdom .

OTHER PUBLICATIONS

Flexo Accessories Co. Propheteer 700 Standard Features Photo and Data Sheet.
Webtron 1000 Drawing and Description.
Allied Gear Flexomaster I Description and Drawing.
Allied Gear Flexomaster II Drawing and General Description.
Comco Equipment, Inc. Commander Drawing and Specifications.
Comco Equipment, Inc. Print Station Drawing.
Magna–Graphics MGC Flexo Press Photos and Description.
Mark Andy, Inc. Mark Andy 2200 Drawing, Specifications and Description.
Ko-Pack 250 Drawing and Description.

*Primary Examiner*—Chester T. Barry
*Attorney, Agent, or Firm*—Hovey, Williams, Timmons & Collins

[57] ABSTRACT

An apparatus and method for the continuous manufacture of printed, laminated stock is provided. The apparatus is designed to use plain, uncoated webs and at separate stations along a continuous path apply a release coating, apply an adhesive, join the webs together and imprint the combined webs to yield a final, laminated and imprinted stock. By die cutting and stripping the stock at further stations, discrete elements such as labels may be produced and carried by one of the webs. The apparatus preferably includes stations for curing and remoisturizing the release coated web, whereby a known moisture content is provided for the release coating prior to the application of adhesive and joining the webs into laminated stock. The process includes providing respective webs, applying a release coating to one web, joining the two webs together, imprinting at least one of the webs and routing the combined webs to a delivery station whereby the entire process is continuous and uninterrupted.

14 Claims, 4 Drawing Sheets

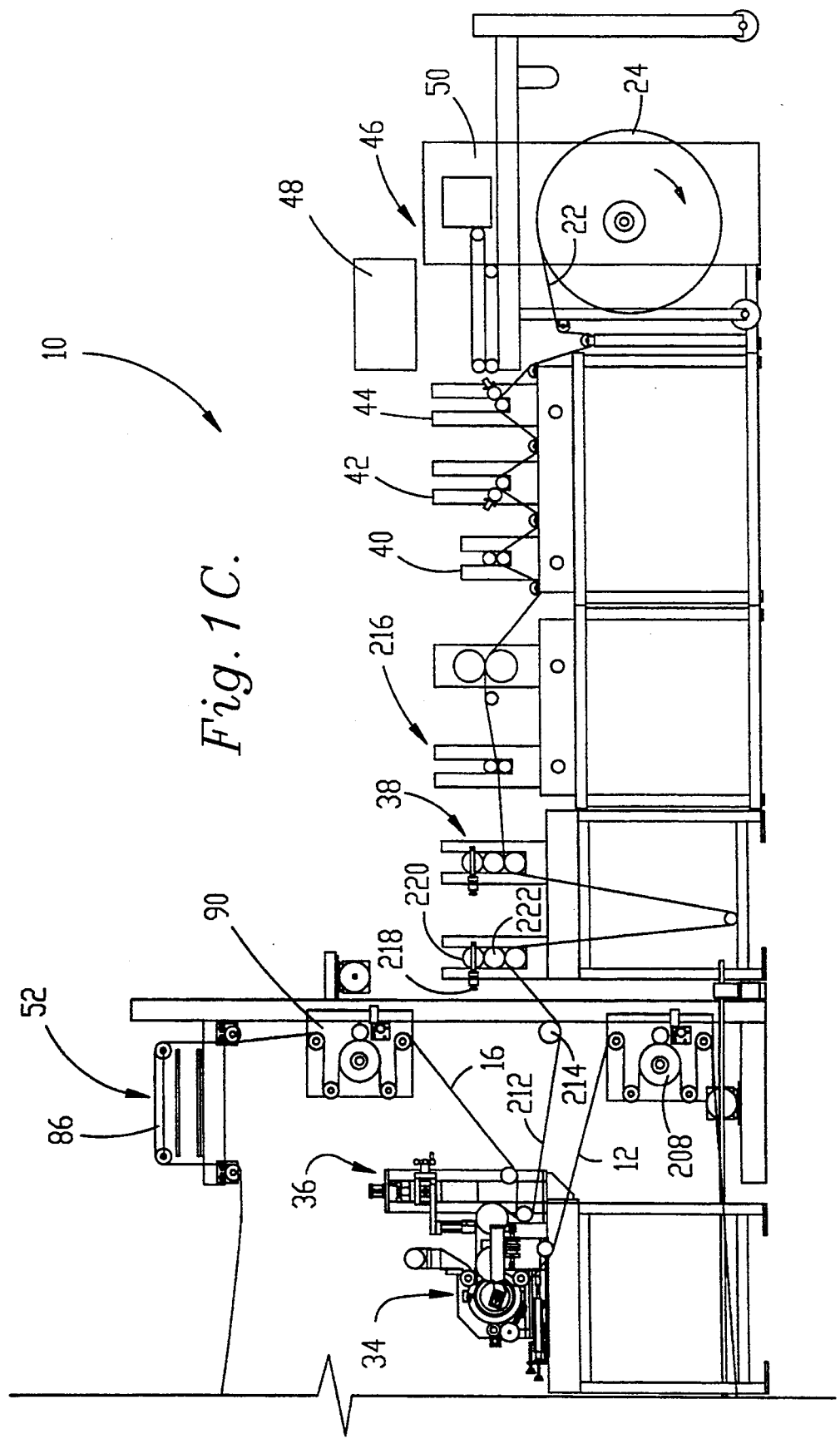

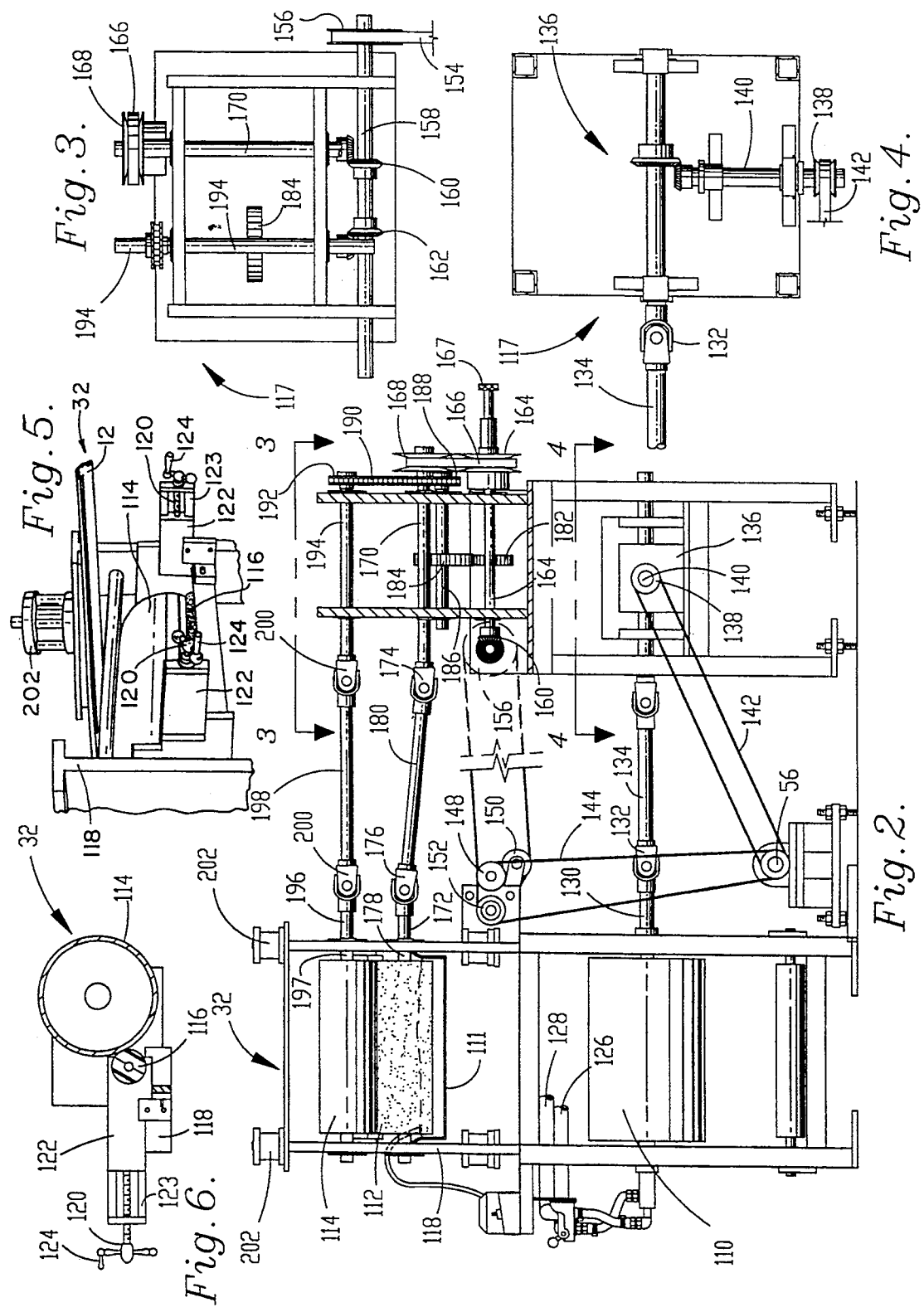

METHOD AND APPARATUS FOR CONTINUOUS MANUFACTURE OF PRINTED LAMINATED STOCK FROM UNCOATED WEB

BACKGROUND OF THE INVENTION

1. Field of the Invention

This invention concerns a method and apparatus for manufacturing, in a continuous and uninterrupted process, imprinted laminated stock from continuous webs. A first web from uncoated stock is provided with a release coating and then joined to a second web for printing and processing for completion into a final laminated product.

2. Description of the Prior Art

It is well known in the art to run pre-laminated sheets through a printing and die cutting station to produce a final, imprinted product. Examples of such products include labels, coupons, and stickers where an imprinted top web is adhesively joined to a bottom web. The top web is removable from the bottom web or carrier sheet by virtue of a release coating which has been applied to the carrier sheet. Because the adhesive resists attachment to the coating, it instead adheres to the top web and allows the top web to be readily attached to another surface.

In the past, the final printed laminated web was in fact created in separate manufacturing steps. Typically, this involved the separate manufacture of the carrier sheet by providing raw or uncoated paper stock and then applying the release coating thereto. The carrier sheet was then stored and subsequently delivered to a second facility for adhesively joining to a top web which had been imprinted. In one example set forth in U.S. Pat. No. 4,661,189, a coated web was joined to a printed label stock by screen printing of adhesive to one of the webs before die cutting and stripping to produce a final product. The process required a carrier web to which a release coating had been applied. More recently, as shown for example in U.S. Pat. No. 5,021,273, the top web has been imprinted subsequent to joining the two webs together. However, the process illustrated therein required the provision of the first and second webs as a pre-laminated roll, and not as part of a continuous process beginning with uncoated webs.

While satisfactory final products have been produced in accordance with the teachings of the prior art, the processes have been inflexible and subject to accumulation of a variety of inventory of expensive, pre-laminated or pre-coated stock. The necessity of starting with raw paper, applying a silicone or other release coating, storing that roll until needed, and then transferring the roll with a release coating to a face stock printing, adhesive coating & laminating and die cutting press for mating with a face stock roll is time consuming, labor intensive, and requires additional transportation resources. Additionally, problems in controlling moisture changes in the webs during storage and processing have led to a need for remoisturizing the web during manufacture of the laminated stock. There has thus developed a need for a method and apparatus whereby essentially raw paper stock can be turned into an imprinted and laminated article in a single, continuous and uninterrupted process.

SUMMARY OF THE INVENTION

These and other problems are solved by the present invention which provides an apparatus and a method for the continuous and uninterrupted production of a printed laminated product from uncoated webs. The in-line apparatus and method hereof thus avoids the problems previously encountered by giving the operator substantial flexibility in printing both laminated and unlaminated materials, varying the coatings and adhesive applied, changing the printing colors or plates or a variety of other options relating to die cutting, perforating, provision of sheets or rolls and the like all on a single machine using relatively inexpensive uncoated paper stock.

Broadly speaking, the present invention preferably accomplishes these goals through guiding continuous webs from respective holding stations to processing structure including a series of individual stations in an in-line printing apparatus and method which utilizes first and second webs of uncoated paper stock which are fully processed into a final imprinted laminated stock through a series of successive steps. Preferably, the first web is fed continuously and without interruption through a sequence of stations where a release coating such as silicone is applied, cured, chilled and remoisturized to a desired and controlled moisture content. The second web is fed into the apparatus for laminating with the first web. Prior thereto, an adhesive coating is applied to one of the first and second webs. The webs are then laminated with the adhesive located between the silicone coating of the first web and the bottom of the second web. The adhesive may be applied continuously, in strips or printed with an adhesive application system such as a screen printer, adhesive transfer die, gravure roll or other system in a continuous or an intermittent pattern, and may be applied to either the coated side of the first web or to the bottom of the second web.

The laminated web is then passed without interruption to a press unit including stations for printing, perforating, die cutting and stripping of the waste portion as necessary. At a final delivery station, the laminated product may be wound on a reel, fan-folded, stacked as individual sheets or otherwise accumulated for delivery to the end user.

The present invention is able to accomplish the continuous and uninterrupted manufacture of this product and avoid the necessity of separately creating the coated carrier sheet from the first web and removing the carrier sheet for subsequent use in creating the laminated and printed product. This is accomplished by the unique combination of stations in the sequence set forth herein, and more particularly by the provision of a curing apparatus for curing the release coating applied to the first web, and then immediately after curing applying a quantity of moisture to the web which has been silicone coated for remoisturizing the paper to provide for equilibration between the paper layers and to inhibit relative distortion therebetween after marrying or mating. The cured coated sheet is often warm or even hot when emerging from the curing station, and thus in preferred forms the remoisturizing station includes cooling apparatus to control moisture loss through evaporation.

The cooling and remoisturizing station is particularly unique in that the coated and cured first web is fed into the remoisturizing station at a temperature elevated above ambient. To provide for effective remoisturization, the coated and cured web is cooled by, for example, a chilling roll, then passed through a remoisturizing roll. The remoisturizing system first receives a quantity of water on a pickup roll, transfers the moisture therefrom to a transfer roll, and then employs a doctor blade or a roller to wipe the excess moisture off the moisture transfer roll, which thus assures the proper quantity of moisture is delivered to the cured and coated web, leaving a film of water to provide the desired moisture content to the cured and coated web. The cured and coated web is preferably cooled once more by passing the web adjacent a chilled roll, thus providing a carrier sheet having a release coating which is immediately available for receiving an adhesive, laminating, printing and cutting as desired.

The entire apparatus and process are synchronized by a drive shaft which is connected to each of the processing stations so that the webs passing therethrough are maintained in longitudinal alignment during processing. It may be appreciated that alignment and registry problems are exacerbated when the number of steps or stations are greater than in conventional processing.

The continuous and uninterrupted processing also results in closer control over the moisture level of the carrier sheet when fed to the adhesive-applying station in that there is no variation in moisture caused by storage of the carrier sheet over an extended period. The adhesive may be applied to either the bottom of the second web or to the release coating over the first web in a full or intermittent coating continuous application, on strips or screen printed or otherwise applied in any desired pattern. In most applications, the adhesive is applied over the release coating of the first web prior to lamination and then the two webs are joined together in face-to-face relationship. The resulting laminated web is then printed, perforated, and die cut as desired, with any excess or waste matrix removed by winding on a take-up reel as is conventional and shown in U.S. Pat. No. 4,661,189, incorporated herein by reference. This in turn allows considerable flexibility with respect to the number of print stations, die cutting pattern, perforation pattern and manner of collection and storage to be employed, all on a single apparatus.

The apparatus hereof is particularly suited to the manufacture of laminated articles such as labels, stickers and the like which employ a laminated stock where the top web is printed and carries the adhesive with it when removed from the bottom carrier sheet. However, as may be evident from the drawings and following description thereof, the present invention is extremely adaptable in that other articles can be manufactured on the same machine without excessive adaptation or conversion. For example, the apparatus hereof may be used as a print and die cut press for handling pre-laminated or unlaminated sheets simply by using only the second web. Conversely, the first web can be routed past the coating, curing and remoisturizing stations in the event that the operator desired to produce a product which included top and bottom webs adhered only along some or all of the margins and then die cut or perforated so that a portion of the webs remained together while another portion of each was separable. Thus, the present invention describes a truly convertible apparatus can do the job of many other prior art machines.

BRIEF DESCRIPTION OF THE DRAWINGS

FIGS. 1A, 1B and 1C are respectively sectionalized right side elevational views of the apparatus for continuous manufacture of a printed laminated web hereof, with portions of the printing, die cutting and waste matrix take-up rolls shown schematically;

FIG. 2 is an enlarged vertical cross-sectional view of the apparatus hereof showing the remoisturizing station;

FIG. 3 is an enlarged fragmentary top plan view taken along line 3—3 of FIG. 2 showing the gear drive for the remoisturer rollers;

FIG. 4 is an enlarged fragmentary horizontal cross-sectional view taken along line 4—4 of FIG. 2 showing the gear drive for one of the cooling rolls;

FIG. 5 is an enlarged, fragmentary perspective view of the remoisturizer wiping roller; and FIG. 6 is an enlarged, fragmentary vertical cross-sectional view of the remoisturizer wiping roller.

DESCRIPTION OF THE PREFERRED EMBODIMENT

Figure 1A:
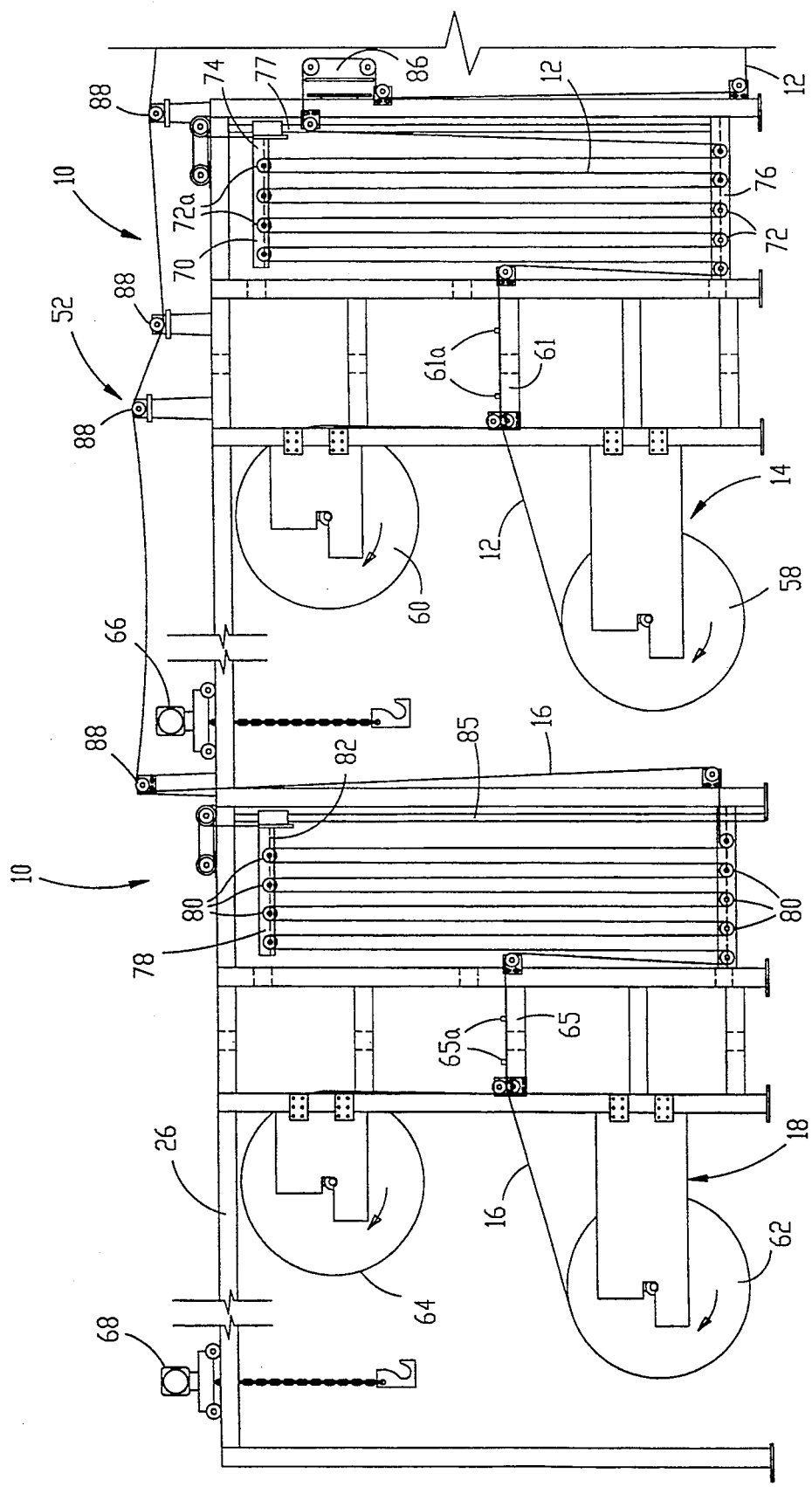
Figure 1B:
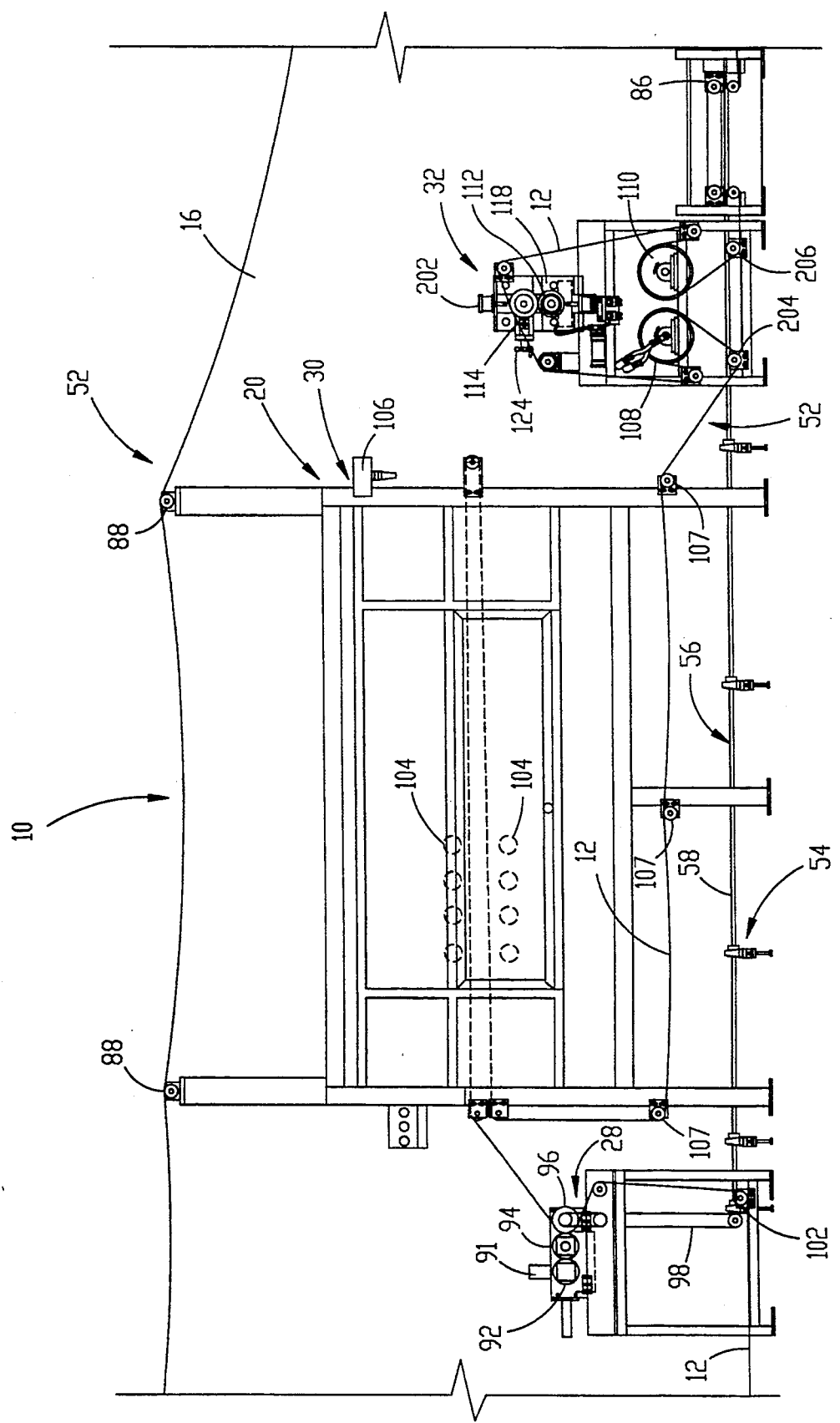

Referring now to the drawing, an apparatus 10 for continuous manufacture of a laminated printed stock from uncoated webs is shown in FIGS. 1A, 1B and 1C, with FIG. 1A illustrating the upstream or "raw material" end of the apparatus and FIG. 1C illustrating the downstream end for printing and receiving the finished article. The apparatus 10 receives a first web 12 of uncoated material such as paper at a first holding station 14 and a second web 16 is held at a second holding station 18. The two webs are guided to a processing structure 20 adjacent to the holding stations for the application of a release coating, application of an adhesive, lamination, printing, die cutting, perforation and/or separation as desired to yield a printed laminated final stock 22 which may be collected at a delivery station such as a reel 24, or alternatively fan-folded or stacked as individual sheets for shipment to the end user.

In greater detail, apparatus 10 includes a web holding frame 26 for carrying first holding station 14 and second holding station 18. Processing structure 20 includes a release coating station 28, a curing station 30, remoisturizing station 32, adhesive application station 34, joining station 36, print station 38, and optionally die cut station 40, perforation station 42, slitter station 44, and delivery station 46. Delivery station 46 may alternately include a folder station 48, a sheet cutter station 50, or reel 24. Processing station may further include a waste matrix rewind reel (not shown) for receiving a waste web produced during die cutting. The apparatus 10 also includes a guide system broadly designated by the reference numeral 52 for guiding the webs 12 and 16 through the apparatus 10 and a synchronizing mechanism 54, preferably provided as an elongated driveshaft 56 interconnecting the stations of the processing structure for correlating the feed rates of the webs 12 and 16.

As may be seen in FIG. 1A, frame 26 supports first holding station 16 rotatably carrying primary first web supply reel 58 to feed first web 12 along a downstream path defined by the web 12. Web 12 is preferably plain, uncoated paper. Frame 26 also rotatably supports a back-up first web supply reel 60 for supplying first web 12 when the primary first web supply reel is exhausted. A splice area 61 is positioned on the frame 26 intermediate the supply reels 58 and 60 and the festoon 70 which includes gripper bars 61a and a manual or automatic knife and taping mechanism for splicing the web 12 from a new supply reel to the remainder or end of the web 12 from the just exhausted supply reel. Similarly, frame 26 supports second web holding station 18 which rotatably carries primary second supply reel 62 to feed second web 16 along a downstream path defined by the web 16. Web 16 is also paper and will ultimately receive imprinting at print station 38. Frame 26 supports backup second web supply reel 64 for supplying second web when primary second web supply reel is exhausted. A second splice station 65 is provided intermediate supply reel 62 and 64 and festoon 78 which includes gripper bars 65a as well as an automatic or manual knife and splicing tape station, again for splicing paper from a new supply reel 62 or 64 onto the end or remainder of the web 16 carried by festoon 78. Cranes 66 and 68 are shiftably supported by frame 26 to roll therealong, thereby enabling the supply reels to be changed.

Festoon 70 is carried by frame 26 and receives web 12 from reel 58. Festoon 70 includes a plurality of rollers 72 mounted on arm 74 and foot 76. Arm 74 is carried for vertical shifting on upright rod 77 attached to frame 26 to enable the festoon 70 to shorten the distance between the arm 74 and foot 76 when reel 58 is exhausted of its supply of paper for web 12. Festoon 78 similarly receives web 16 from station 18 and includes a plurality of rollers 80 mounted on arm 82 and foot 84. Arm 82 is carried for vertical shiftable movement on rod 85 connected to frame 26 for the same purpose with regard to web 16 and festoon 78 as arm 74 respective to festoon 70.

Second web 16 is moved downstream and routed above the frame 26 by guide system 52. Guide system 52 includes edge guides 86 for maintaining lateral alignment of the webs during downstream movement, a plurality of support rollers 88 for supporting second web 16 above the frame 26 and the curing station 30, and web tensioner 90 immediately upstream from joining station 36 for maintaining proper tension on the web 16. An exemplary edge guide 86 is an Accuguide Electronic Web Guide by AccuWeb, Inc. of Madison, Wis., and a web tensioner 90 found useful with this invention is a Magpower Digital Tension Control by Magpower of Fenton, Mo. Second web 16 is thus led downstream by the guide system 52 to joining station 36 for mating with first web 12.

First web 12 is oriented downstream from festoon 70 through an edge guide 86 to coating station 28. Coating station 28 receives a quantity of release coating such as silicone release coating familiar to those in the art and transfers the coating from an enclosed doctor blade 91 in which it is retained via a pickup roll 92 to a coating anilox roll with web 12 passing between the application roll 94 and a base roll 96 whereby the release coating is applied to only one side 100 of the web 12. Base roll 96 is driven by a belt 98 from a gearbox 102 connected to shaft 58.

Web 12 then passes directly from the coating station 28 to the curing station 30. Preferably, the curing station 30 includes infra-red or ultraviolet elements 104 to apply radiation (e.g., heat or ultraviolet) to the side 100 of the web passing therethrough. In FIG. 1B, the web 12 makes two passes through the curing station 30 whereby the coating applied to side 100 is exposed to the elements located above and below the path of the web 12. A generally horizontal path is illustrated in the drawing, but it is to be understood that a number of passes may be provided and that the passes may be vertical or inclined rather than horizontal. One oven useful as a curing station 30 is AMJO Infra-Red Short Wave Dryer by Amjo, Inc. of Marshall, Mo. but other systems such as gas fired or steam dryers could be employed. An infra-red sensor 106 is positioned outside the curing station 30 for detecting the heat of the web 12 after the web 12 makes its first pass through the curing station 30 so that the amount of radiation supplied to the web 12 may be controlled.

After the web 12 leaves the curing station 30 it is guided by rollers 107 beneath the curing station 30 to remoisturizing station 32. Remoisturizing station 32 is shown generally in FIG. 1B and in greater detail in FIGS. 2 through 6. Remoisturizing station 32 generally includes twin chill rolls 108 and 110 for cooling the web 12 after it leaves the curing station 30 and again as it leaves the remoisturizing station. In addition, the station 32 includes a water pan 111 serving as a moisture source, a water pickup roller 112 having a porous rubber covering, a water transfer roller 114, and a squeegee roller 116 for removing excess moisture carried by the water transfer roller 114 prior to the latter coming in contact with the web 12. The squeegee roller 116 is mounted to the framework 118 of the station 32 for adjustable and shiftable movement relative to the transfer roller 114 by spaced screw rods 120 each threaded into a respective block 122 connected to beams 123 fixed to framework 118. By turning the handles 124, the squeegee roller 116 may be moved toward or away from the transfer roller 114 and thereby exert more or less pressure thereagainst. The squeegee roller 116 is made of rubber or a synthetic substitute to wipe away excess moisture without damaging the transfer roller 114.

The chill rolls 108 and 110, and pickup roller 112 and transfer roller 114 are driven off the driveshaft 56 through a transfer unit 117. Chill rolls 108 and 110 are rotatably mounted to framework 118 by hollow shafts supported on pillow blocks. The shafts are supplied with chilled water by conduit 126 and return conduit 128 from a chill unit such as a model HCC1000PR from Koolant Koolers, Inc. of Kalamazoo, Michigan (not shown). Chill roll 110 is driven by shaft 130 operably connected by a pair of universal joints 132 and a midshaft 134 to a gearbox 136, shown in FIG. 4. Gearbox 136 is in turn driven by a pulley 138 mounted on longitudinal shaft 140 and connected to driveshaft 56 by belt 142. Driveshaft 56 also directly drives pickup roller 112 and 114 by belt 144 connected to pulley unit 146 consisting of idler pulleys 148 and 150 and drive pulley 152. Drive pulley 152 includes paired, side-by-side pulleys connected to cross-belt 154. Cross-belt 154 in turn drives pulley 156 connected to shaft 158 mounting bevelled gears 160 and 162. Bevelled gear 160 drives lower shaft which also mounts pulley 164 at the end remote thereto for driving belt 166. Pulley 164 may be adjusted for tensioning belt 166 by rotating adjustment knob 167. Belt 166 in turn drives pulley 168 which is mounted to midshaft 170. Midshaft 170 in turn is connected to shaft 172 mounting pickup roller 112 by a pair of universal joints 174 and 176 and shaft 180. Shaft 172 is coupled to shaft 178 mounting pickup roller 112 thereon. Bevelled gear 162 is carried by a shaft mounting gear 182 which drives gear 184 carried by shaft 186. Shaft 186 mounts a sprocket 188 for driving chain 190 connected to sprocket 192 on upper shaft 194. Upper shaft 194 is connected to shaft 196 coupled to axle 197 mounting transfer roller 114 by a connecting shaft 198 and a pair of universal joints 200. Framework 118 also mounts a pair of pneumatically actuated pancake cylinders 202 which serve to move transfer roll 114 up or down and thus out of or into engagement with pickup roll 112.

Web 12 is routed into the remoisturizing station 32 from curing station 30 by passing over rollers 107 and beneath roller 204 before contacting chill roller 108. Web 12 exits the remoisturizing station by passing under roller 206 and through an edge guide 86 before passing to tensioner 208 which includes a drum metering unit with and electronic transducer to sense and correct the tension in the web 12. Web 12 then passes to adhesive application station 34. At adhesive application station 34, adhesive is applied to the coated side 100 of the web 12. The adhesive may be applied by a number of different methods, but screen printing the adhesive provides good coverage and economy and is a preferred method. A suitable screen printer 210 for applying the adhesive is Model SP 117 by Mercer Corporation of Hendersonville, Tenn.

Web 12 is married to web 16 at joining station 36 which is of conventional design and familiar to those skilled in the art. Web 12 is joined to web 16 whereby the coating and adhesive applied to web 12 face web 16 and are thus positioned intermediate the webs. After marrying, web 12 and web 16 together comprise combined web 212. The combined web 212 is tensioned by dancer roller 214 and passes through one or more print stations 38. The print station 38 hereof is carried by a press unit 216, and one suitable press unit for this purpose is a Propheteer 1700 Label Converting Machine by Flexo Accessories Co. of Palatine, Ill. The press unit 21 6 drives driveshaft 58 for synchronizing the operation of the print stations 38, die cut station 40, perforation station 42 and slitter 44. The print stations 38 may be entirely conventional lithographic, flexographic, or other print stations, or alternately may include an enclosed doctor blade 218 adjacent an anilox roll 220 and print cylinder 222 as shown in FIG. 1C. Additional print stations 38 may be included to provide printing in different colors, or a turnbar may be positioned between the print stations in the event printing was to be applied to both exposed sides of the combined web, whereby a combined, printed, laminated stock 22 is created.

The combined, printed laminated stock 22 may then be passed to a die cut station 40 where labels, coupons or the like may be formed by die cutting the second web. A waste matrix may be formed thereby which may, if desired, be stripped and rewound on a waste matrix reel (not shown), as is conventional. Perforation station 42 and slitter station 44 are also illustrated for performing optional processing steps prior to passing the completed imprinted laminated stock 22 to delivery station 46. The imprinted, laminated stock may be rewound on reel 24, or alternatively routed to sheet cutter station 50 for cutting and stacking individual sheets or to folder station 48 for fan-folding.

The webs 12 and 16 are processed into a combined, printed, laminated stock 22 by supplying preferably plain, uncoated paper from respective holding stations, routing the webs by guide means to a processing station which includes applying a release coating, curing the release coating, and remoisturizing one of the webs, and applying printing to one or both of the webs. An adhesive is applied to one of the webs, and preferably directed onto the release coating applied to one of the webs. While the printing may be applied to the webs prior to joining, it is preferably applied after joining the webs. The imprinted, laminated stock may then be die cut, perforated or slit before being routed to a delivery station such as a reel, fan fold station or sheet cutter station.

It may be appreciated that the present invention provides the ability to process raw, uncoated and unprinted paper into a final laminated article such as a label or the like on a single apparatus 10 and in a single, continuous process. It may also be appreciated that the present invention includes substantial flexibility by enabling the printer to use as many of the stations as is desired. For example, the apparatus 10 allows the printer to skip the entire coating, curing, remoisturizing, adhesive application, and joining stations if desired to produce a single web printed product, simply by using only second web 16 and passing it from tensioner 90 directly to print station 38.

The apparatus and method of the present application also permit a more precise control of the level of moisture in the web 12 upon application of the adhesive, because the web 12 is fed continuously from the curing station 30 to the remoisturizing station 32 and then to the adhesive application station 34. This contrasts with the prior art wherein the coating was applied in a separate process, such that the coated web may have been left in storage for an indefinite period of time, consequently affecting the level of moisture in the web as fed to the adhesive application station and the joining station. Thus, the use of the remoisturizing station allows a controlled amount of moisture to be reintroduced to the paper which has been release coated in an in-line press.

When the web 12 is initially supplied, it has a moisture of 6 to 7% by weight. After application of the silicone release coating and passage through the curing station 30, it has a moisture content of about 2%. It is important that the laminated stock 22 have a fairly consistent moisture content between the web 12 and the web 16 to avoid curling or wrinkling due to variances in moisture. Thus, because the web 16 is supplied with a moisture content of 4 to 5.5% by weight, the web 16 is cooled and remoisturized at the remoisturizing station 32 to a final moisture content in the range of 4 to 5.5% percent by weight upon leaving the remoisturizing station. This makes both webs of about the same moisture content to avoid curling or wrinkling in the laminated stock. This level may be monitored intermittently by a hand-held moisture sensor with good results, or alternatively a permanent moisture sensor may be positioned between the curing station and the remoisturizing station. Additional sensors may be positioned at other locations, e.g., downstream from the remoisturizing station, to provide better monitoring of the moisture content of the first web 12.

In order to increase the amount of moisture to be added to the web 12 and particularly side 12 having the release coating applied thereon, the operator may turn the handle 124 to move the squeegee roller 116 closer to the transfer roller 114 over which the web 12 passes, thereby wiping more moisture off the transfer roller 114 and limiting the amount of moisture which may pass to the web 12. By turning the handle in the opposite direction, the operator may move the squeegee roller 116 away from the transfer roller and allow more moisture to pass to the web 12. Alternatively, the positioning of the squeegee roller 116 could be automatically controlled by a servo motor connection between the mechanism for positioning the squeegee roller and the moisture sensor. The chill rolls 108 and 110 cool the web 12 which was heated during passage through the curing station 30 to thereby limit moisture loss due to evaporation.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims.

We claim:

1. Apparatus for continuously producing imprinted laminated stock, comprising:
   means for holding respective supplies of first and second elongated webs;
   web processing means adjacent said web holding means and including structure for imprinting at least one of said webs, for applying a release coating to at least one of said webs, for curing the release coating, for remoisturizing the release coated web after curing of the release coating, for applying adhesive to one of said first and second webs, and for joining webs to present a combined, laminated stock,
   said imprinting, coating, curing, remoisturizing, adhesive-application, and joining structure being proximal to said web-holding means and oriented as individual, in-line stations;
   means for guiding said first and second webs along corresponding continuous first and second paths of travel for delivery to said processing means; and
   means for operating at least some of said stations of said web processing means in synchronization for producing imprinted laminated stock,
   wherein said stations for applying a release coating, curing the release coating and remoisturizing the release coated web are located on the first path defined by said first web and positioned upstream from said station for joining said webs.

2. Apparatus as set forth in claim 1, wherein said curing station includes means for generating infra-red radiation directed toward the release coating applied to said first web.

3. Apparatus as set forth in claim 2, wherein said curing station includes structure for directing said first web along multiple passes through said curing station.

4. Apparatus as set forth in claim 1, wherein said remoisturizing station comprises an individual, in-line station positioned along said first path downstream from said curing station.

5. Apparatus as set forth in claim 4, wherein said remoisturizing station includes means for cooling said web.

6. Apparatus as set forth in claim 5, wherein said cooling means includes a chilled roller.

7. Apparatus as set forth in claim 6, wherein said remoisturizing station includes means for adjusting the amount of moisture applied to said first web.

8. Apparatus as set forth in claim 7, wherein said remoisturizing station includes a web support roller, a moisture transfer roller, and structure mounting said moisture transfer roller for shiftable movement toward and away from said web support roller.

9. Apparatus as set forth in claim 1, wherein said adhesive-application station is located on said first path downstream from said remoisturizing station for applying adhesive to said one of said webs after said coating, curing and remoisturizing stations and upstream from said joining station.

10. Apparatus as set forth in claim 9, wherein said adhesive-applying station comprises a screen printer.

11. Apparatus as set forth in claim 1, wherein said web processing means includes at least one die-cut station for receiving printed laminated stock and cutting at least portions of one of said web to define discrete elements carried by the other of said webs.

12. A method of continuously manufacturing imprinted, laminated stock comprising the steps of:
   providing a first uncoated web at a first holding station;
   applying a release coating to said first web at a coating station;
   curing said release coating;
   reintroducing a desired quantity of moisture to said release coating after curing at a remoisturizing station;
   providing a second web at a second holding station;
   applying a quantity of adhesive at an adhesive-application station to one of said first web and said second web;
   joining said first web to said second web at a joining station whereby said cured and remoisturized release coating of said first web is oriented toward said second web to present a combined, laminated web;
   imprinting one of said first web and said second web at a printing station;
   guiding said first web without discontinuity from said first holding station to said joining station;
   guiding said second web without discontinuity from said second holding station to said joining station; and
   routing the combined laminated web from the joining station to a delivery station without discontinuity, whereby said first and second webs are supplied from said respective holding stations in a substantially continuous and uninterrupted manner to said joining station and then to said delivery station.

13. A method as set forth in claim 12 including the step of feeding said first web from said remoisturizing station to said adhesive application station for applying an adhesive over said release coating prior to feeding said first web to said joining station.

14. A method as set forth in claim 13 wherein said first web and said second web are joined prior to imprinting.

* * * * *